United States Patent
Schmonsees

[11] Patent Number: 5,842,221
[45] Date of Patent: Nov. 24, 1998

[54] DYNAMIC FREQUENTLY ASKED QUESTIONS (FAQ) SYSTEM

[75] Inventor: Robert J. Schmonsees, Potomac, Md.

[73] Assignee: WisdomWare, Inc., Falls Church, Va.

[21] Appl. No.: 802,634

[22] Filed: Feb. 19, 1997

[51] Int. Cl.[6] ................................................. G06F 17/00
[52] U.S. Cl. .............................. 707/104; 707/4; 707/102; 707/501; 707/517
[58] Field of Search ..... 707/1–206; 395/200.31–200.48

[56] References Cited

U.S. PATENT DOCUMENTS

| | | | |
|---|---|---|---|
| 5,592,375 | 1/1997 | Salmon et al. | 707/5 |
| 5,768,510 | 6/1998 | Gish | 395/200.33 |
| 5,774,628 | 6/1998 | Hemphill | 1/1 |

Primary Examiner—Thomas G. Black
Assistant Examiner—David Yiuk Jung
Attorney, Agent, or Firm—Nixon & Vanderhye P.C.

[57] ABSTRACT

The present invention provides a navigational interface for Frequently Asked Question (FAQ) documents. Specifically, frequently asked questions and their answers and links are treated as part of objects in an object-oriented datamodel. The questions are sorted into selectable topics. Each question is also linked to a corresponding answer, and each answer is linked to appropriate other questions, answers, topics or external information. The topics, selected questions, selected answers and links are simultaneously viewable on a single graphical interface.

10 Claims, 8 Drawing Sheets

KNOWLEDGE OBJECTS

USER NAVIGATION SYSTEM

Fig. 7

E@SY - Author - [MANAGING ADVICE: SALES FORCE AUTOMATION Consulting (Solutions)]

File  Edit  Reports  AnswerMarks  Actions  Tools  Window  Help

Back  Forward  Search  FndNxt  Print  Export  Mark  Note  Assist  Syncup

MANAGING ADVICE: SALES FORCE AUTOMATION Consulting (Solutions)]

Alpha Sort | Add New | Add Link | Delete Link

- FAQs ON TOPIC A
- FAQs ON TOPIC B
- FAQs ON TOPIC C
- FAQs ON TOPIC D
- FAQs ON TOPIC E

This Topic | Common

QUESTION 1
QUESTION 2
QUESTION 3
QUESTION 4
QUESTION 5

THE FULL TEXT FOR THE ANSWER TO QUESTION 4 APPEARS HERE

LINKS APPEAR HERE

LINKS TO QUESTIONS ON OTHER TOPICS

LINKS TO OTHER PAGES

LINKS TO ANYWHERE

Jumped From:

Fig. 8

DYNAMIC FREQUENTLY ASKED QUESTIONS (FAQ) SYSTEM

The present invention relates to a system for creating and managing a data base of Frequently Asked Questions (FAQ) and a user navigation system which allows users to interact with the data base in a dynamic fashion.

BACKGROUND OF THE INVENTION

With the advent of systems that allow wide access to on-line based content like the Internet, Corporate Intranets, Lotus Notes, and others, navigating through the tremendous volume of information has become challenging. Several navigational tools have been developed, including so-called "Frequently Asked Question" (FAQ) pages. FAQ documents or pages provide users with a more structured view of text-based information by presenting the viewer with a list of commonly recurring questions, together with some means for identifying answers to the questions. Prior art FAQ implementations currently take on different forms including:

1. A single page or document with the list of questions and the corresponding answers. In this case, the user scrolls to move through the pages of questions, looking for the question that the user desires an answer to.
2. A single page or document where the questions are listed sequentially on the top of the page and the answers (many times with the corresponding questions repeated) follow in sequential fashion on the lower portion of the page. In this implementation, the system includes some type of location oriented link from the question at the top of the page to the answers on the bottom of the page. This allows the user to see all the questions at once, so they can choose the question that they are interested in before they are brought to the answer. Some of these FAQ documents also include links from the answer back to the question list.

Both of these approaches to FAQ implementations are restricted by their page or document orientation and their one-to-one linking restrictions. That is, in the former implementation, the user must scroll through potentially many questions before finding the question desired. In the latter implementation, the questions and answers are linked in only a one question to one answer relationship.

The key restrictions apply both to the creation and maintenance of the system, and the usability and navigation of the FAQ content. With respect to the creation and maintenance of the prior art FAQ documents, it is difficult for multiple authors to coordinate the modification of the FAQ documents in terms of reordering or adding and deleting new content. It is also difficult to link the questions and answers to other questions and answers within the same topic or other topics.

With respect to the usability and navigation of the prior art FAQ documents, the user is limited to the viewing questions in the order that the author(s) wrote them. This order may not be logical for the tasks desired by the user. The user can also easily lose perspective and context because at any one point in time only one part of the page or document is visible. Also, the user is limited to following the one to one links set by the author or to scrolling through the document in a sequential fashion.

SUMMARY OF THE INVENTION

The invention described herein represents a new user interface and process for managing computer-based FAQs and for navigating these FAQs. The invention is specifically designed to effectively organize and manage frequently asked question pages using a specific linking facility between FAQs and an organization's on-line documents and other information as well as information stored outside the organization, for example on the Internet or an on-line service such as America On-line or CompuServe.

The invention employs a special object-oriented data model for the frequently asked questions, where questions may be grouped in many-to-one relationships with various topics, where each question is linked in a one-to-one relationship with an answer, and where each question may also be linked in a one-to-many relationship with other questions, answers, and other information. Thus, when a user selects a topic and a question, the user receives the answer to the question and links to related information.

For purposes of this specification, the following definitions apply:

1. Knowledge Object: a logical object of text in the invention's database that is either in the form of the name of a topic, a question, or an answer, that also contains at least one link.
2. Link: An electronic connection either directly or indirectly to:
   a. Other Knowledge Objects
   b. Digital information in other data bases or documents or pages that the user may have access to.

Links are in addition to any Hyper Text which may be included in the text.

The invention described herein thus represents a new FAQ system that is specifically designed to create and display FAQs dynamically; that is, without a rigid structure imposed by the author of the FAQ document. The invention is based upon building a database of FAQs where answers and questions are treated as individual objects in that data base as opposed to just being a location for text on a page or document. The invention allows one-to-many connections between objects and simplifies the creation and management of the FAQs, and improves the users ability to navigate through FAQs in a logical fashion. This increases the user's ability to view and retain the answers. The invention operates on commercially available hardware such as PCs, with commercially available programming languages. It can employ commercially available data base products, and network environments such as the Internet and Corporate Intranets.

The invention dynamically builds a frequently asked question session by treating the FAQs as special object oriented data in a Knowledge Object. By treating the FAQs as objects, logical relationships can be established between the FAQs and the topics, answers, links, and other FAQs.

Then the present invention provides a graphical user interface that includes a unique navigational interface design that broadens the user's panoramic view of the selected Knowledge Objects. In essence, the interface allows the user to view the answers in a contextual fashion with other related Knowledge Objects, and to immediately link to any related Knowledge Objects as well as FAQs on other topics. The Interface allows a user to navigate FAQs in a relational or circular fashion.

BRIEF DESCRIPTION OF THE DRAWINGS

The purpose and advantages gained by the present invention will be understood by careful study of the following detailed description of the presently preferred embodiment with particular reference to the accompanying drawings.

FIG. 7 is an example screen of the panoramic navigational user interface; and

FIG. 8 is an example screen of a group hierarchy according to one embodiment of the present invention.

DETAILED DESCRIPTION OF THE PRESENTLY PREFERRED EMBODIMENT

Figure 1:
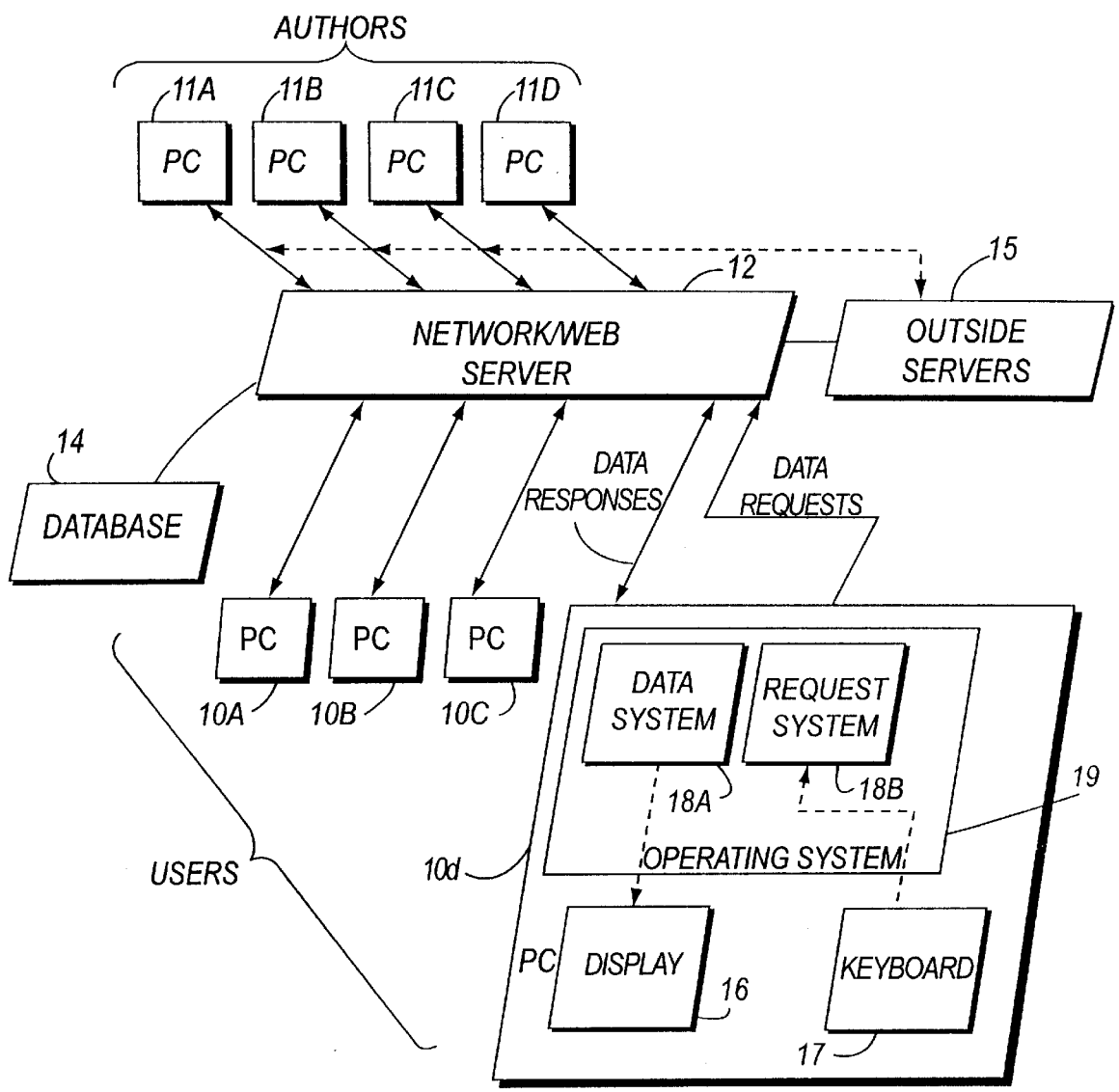
FIG. 1 is a schematic diagram of one example embodiment of the present invention in the form of a system.

FIG. 1 illustrates system hardware used by an example embodiment of the present invention. As can be seen in FIG. 1, the system is centered around a network (or Web) server 12, which provides general networking capabilities for the various other components shown in FIG. 1. In particular, a certain number of PCs 10A–10D are connected to communicate with the network server 12. In addition, there are PCs 11A–11D that also communicate with the network server 12 that are available to so called "authors" of the Knowledge Objects that are contained in the data base.

The PCs 10A–10D are restricted use PCs permitting the users to access and display Knowledge Objects but not modify them. Author PCs 11A–11D differ from the user PCs in that the Author PCs include software for the author to add, modify, and delete Knowledge Objects.

In addition to the network server 12, the system has a data base component 14 that may or may not employ a separate server.

As an option, the network server may be connected to outside servers 15 which may or may not be located on the internet to allow users and authors to connect to information and other services not stored on the network server 12.

The user PC 10D is shown in FIG. 1 in an expanded schematic diagram to illustrate the various components included within each of the PCs 10A–10D. A customary display 16 and keyboard 17 are included along with any pointing device that may be necessary for operation. The software systems running on the PC 10D include a commercially available data display system 18A and a request system 18B.

The request system 18B is used by the operating system 19 to request data from the network server 12 or outside servers 15. The user typically makes these requests through the keyboard 17 or by pointing and clicking on the display 16 indicating to the network server 12 the information requested. The network server sends the information via the data responses line. The data display system 18A of the PC 10D accepts the date response from the server and processes it into a useful format and displays it on the display 16.

Also PCs 11A–11D include the same types of systems shown in PC 10D except that they also include an authoring facility that permits addition, deletion and modification of the Knowledge Objects.

Figure 2:
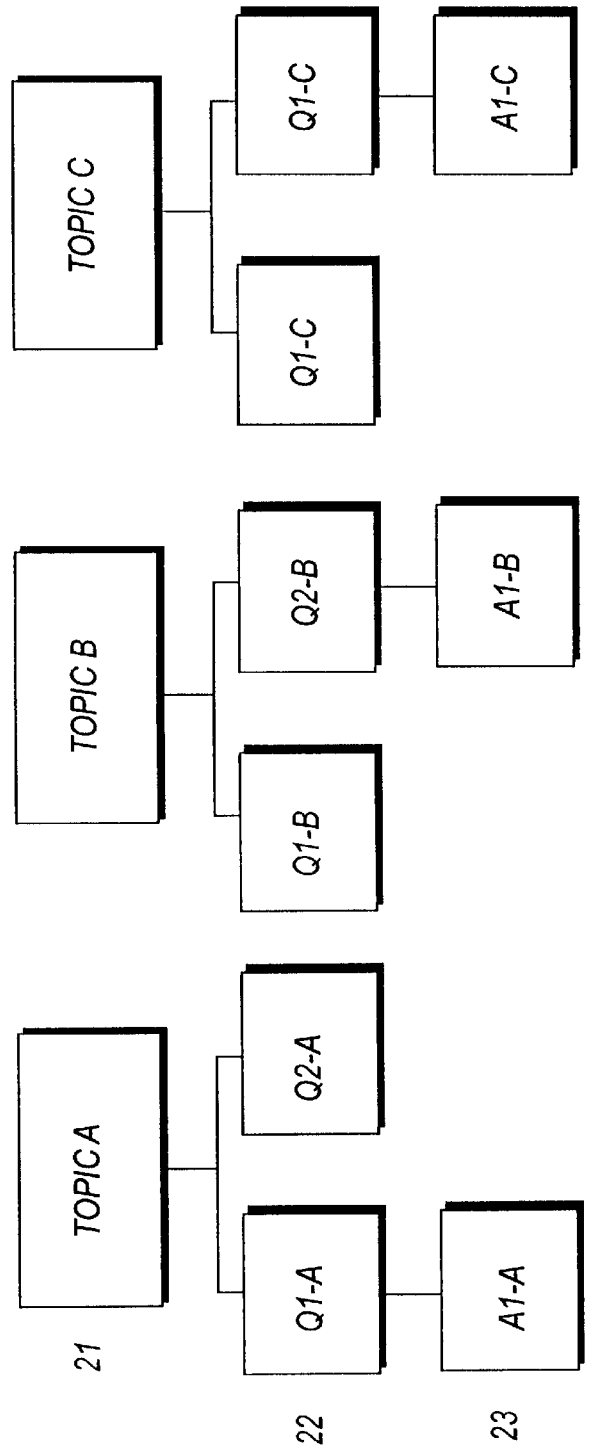
FIG. 2 is a schematic diagram of the basic data model showing minimal links between Knowledge Objects.

FIG. 2 contains an example schematic diagram of the logical hierarchial data model according to one embodiment of the invention. In FIG. 2, three types of Knowledge Objects are stored in the data base: Topic 21, Questions 22, and Answers 23. FIG. 2 shows a minimal hierarchial linking relationship between these three types of Knowledge Objects. The diagram shows that a single Topic A can be linked to many Questions (Q1-A, Q2-A, etc.) within that Topic A. Further, each Question (Q1-A, Q2-B, etc.) can be linked to a corresponding Answer (A1-A, A1-B, etc.). It is important to understand that FIG. 2 represents a minimum linking hierarchy, and that more sophisticated linking hierarchies are usually preferred, as discussed below.

Figure 3:
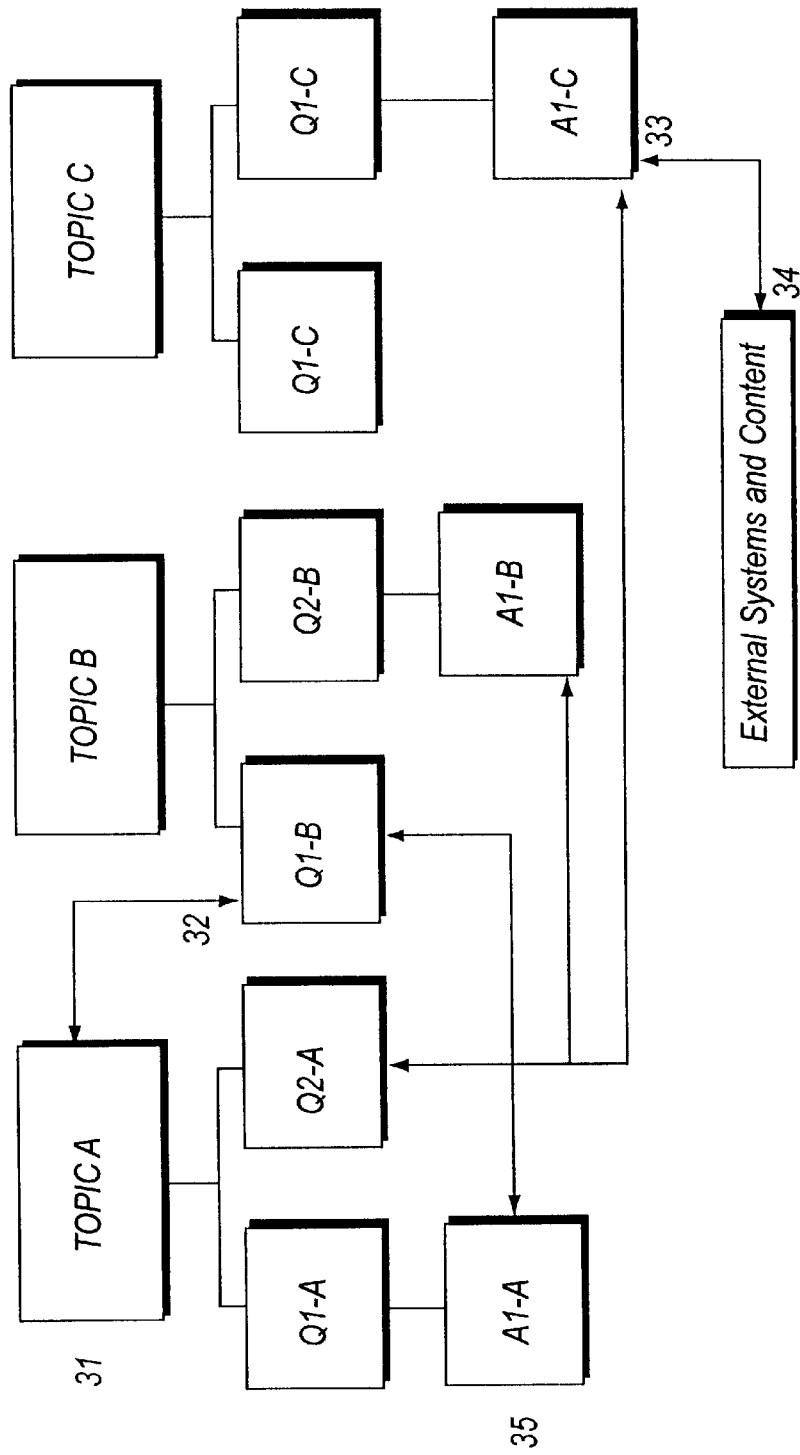
FIG. 3 is a schematic diagram of some potential additional links between Knowledge Objects.

FIG. 3 contains a schematic diagram showing how additional links between objects in different Topics and links to information outside of the data base can be created. The diagram shows how Topics 31 can link to Questions 32 in other Topics and how Answers can be linked 33 to information stored outside of the data base 34.

Note that the links to a question can be made either to the question or to its corresponding answer since the question and answer are employed within the database in a one-to-one relationship.

FIG. 3, Topic A is linked not only to its own questions (Q1-A, Q2-A, etc.), but also to the Question Q1-B of a different Topic, Topic B. Similarly, the question Q1-B can also link back to the answer A1-A in Topic A. Further, the Question Q2-A is shown linking to Answer A1-B of a question Q2 B of a different Topic. The converse is also true, in that Answers A1-B and A1-C link to the Question Q2-A. The diagram also shows how the Answer A1-A to one Question Q1-A can be linked to Questions (e.g., Q1-B) in another Topic B.

The hierarchial relationships shown in FIGS. 2 and 3 illustrate the retrieval of other Knowledge Objects when a user selects a particular Knowledge Object. For example, when the user selects Topic A, under the embodiment of FIG. 3, the user will be directed to Questions Q1-A, Q2-A and Q1-B. Upon selecting Question Q1-B, the user may retrieve A1-A as an answer to the question, as well as Topic A. In this way, when the user has a frequently asked question, the user selects a topic, the topic selection causes the retrieval of certain questions, one of which is theoretically the frequently asked question desired by the user. Upon selecting the frequently asked question, FIG. 2 and 3 illustrate how the answer to the frequently asked question is retrieved, together with related other frequently asked questions, related other topics, related other answers, and related other external links.

The present invention is not limited to the exact hierarchy of Topics, Questions, Answers, and Links, but may include higher or lower order hierarchial groups. For example, the Topics of FIG. 3 can be sorted into Groups those Groups sorted into MegaGroups, etc.

Figure 4:
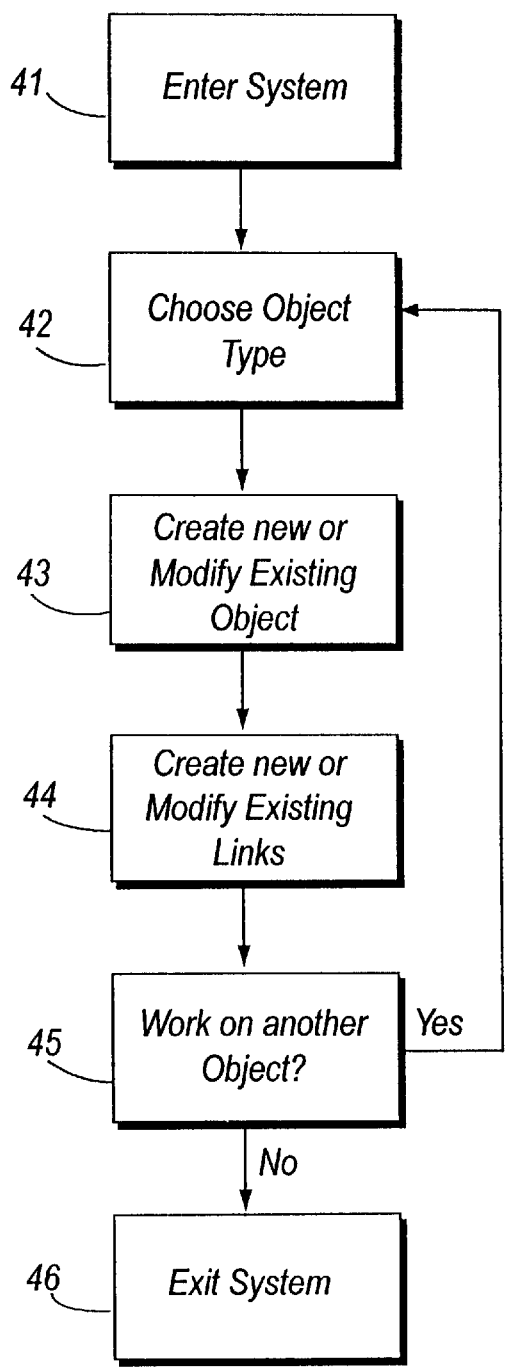
FIG. 4 is a flowchart of the authoring process.

FIG. 4 is a flowchart that represents the process of building or maintaining the knowledge objects in the data base. This is called the authoring process. An authorized author signs on to the system 41, and chooses a type of object to work on 42. For an existing object, the author is presented with the object for modification or deletion, and for a new object, the author is prompted to create it 43. After working on an object, links are added or deleted from that object to other objects or other information not in the data base 44. The system allows the author to point & click to establish and maintain links. Upon completion of work on an object including that object's links, the author can decide to work on another object or exit the system 45. If the author chooses to work on another object, then they may choose a new object type 42 is chosen. Otherwise, the author exits the system at step 46.

The hierarchial links between Topics, Questions, Answers and Links are automatically created by the system during the authoring process.

An important component of the invention is that it allows objects to be linked to others regardless of the type of object; for example, a Topic may be linked to a Question, Answer, or Link.

Of course, as an author builds the linkages, he will do so according to a structure that is logical for the content of the particular Objects that he is linking.

Figure 5:
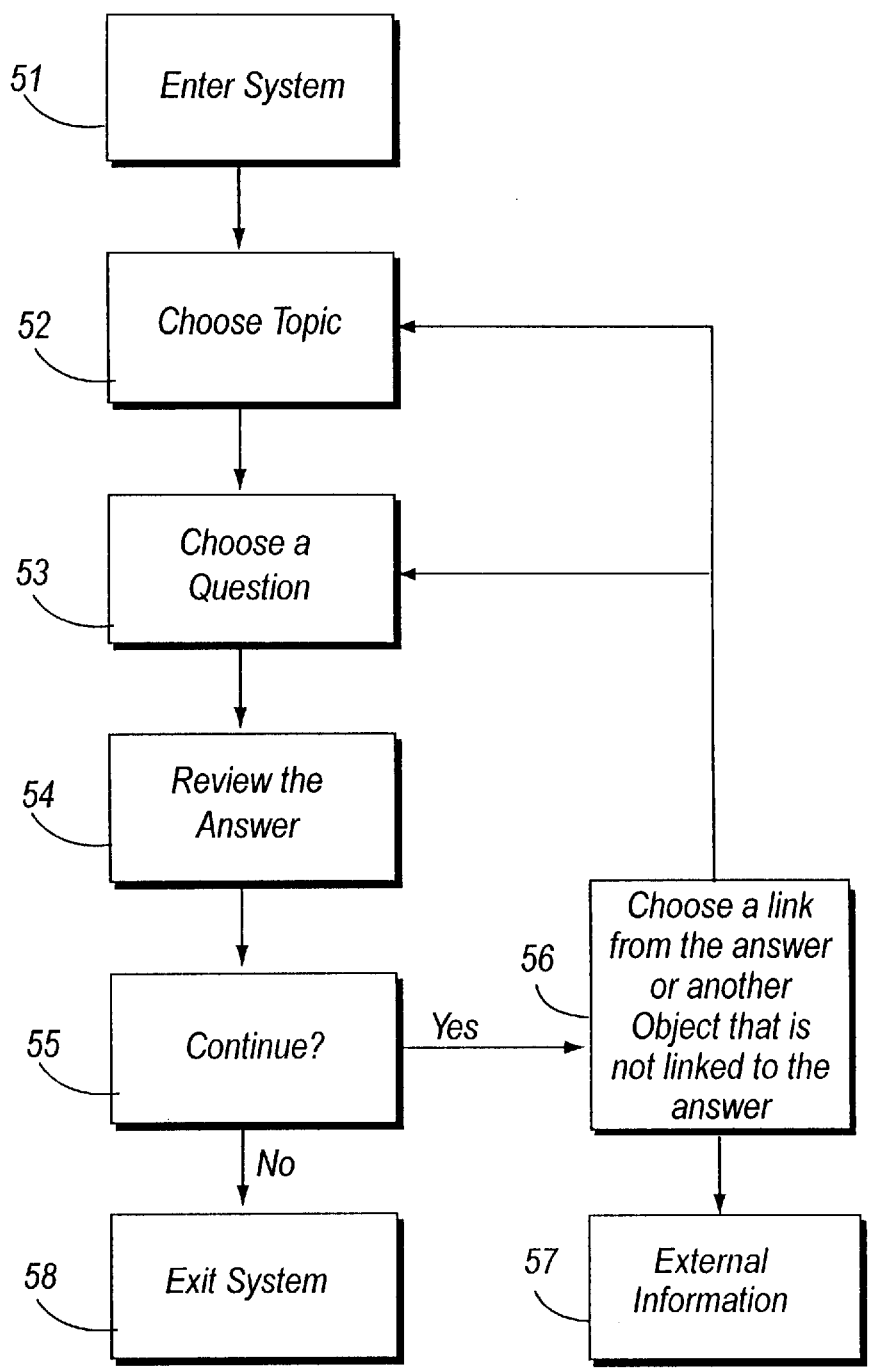
FIG. 5 is a flowchart of the user navigation process.

FIG. 5 is a flow chart of the user navigation component of the invention. To begin a session, a user enters the system 51 and begins the navigation by choosing a Topic from a list that is presented on the screen 52 (see Window One of FIG. 6). Once the user has selected a Topic, a list of Questions that are linked to that Topic appears in another window (see Window Two of FIG. 6). The user then selects a Question from that list by clicking on a specific Question 53. The act of clicking on a Question causes the specific Answer to that Question to appear in a third window (see Window Three of FIG. 6) and Links to that Answer to appear in a fourth window (see Window Four of FIG. 6).

The user then reviews the information contained in the four windows and decides whether or not to continue navigating through the data base 55. If not, the user exits the system 58. Otherwise, the user continues by clicking on another Topic, Question, or Link from the displayed lists at step 56. By clicking on a Topic, the user is given that Topic in the appropriate window 52 and the Questions for that Topic are displayed in Window Two. By clicking on a Question, the user is given that Question in the appropriate window 53 and the corresponding Answer and Links appear in Windows three and four. By clicking on an external Link, an address is sent to a network server 15 and the user is taken to that link location 57, if it is available to them.

Figure 6:
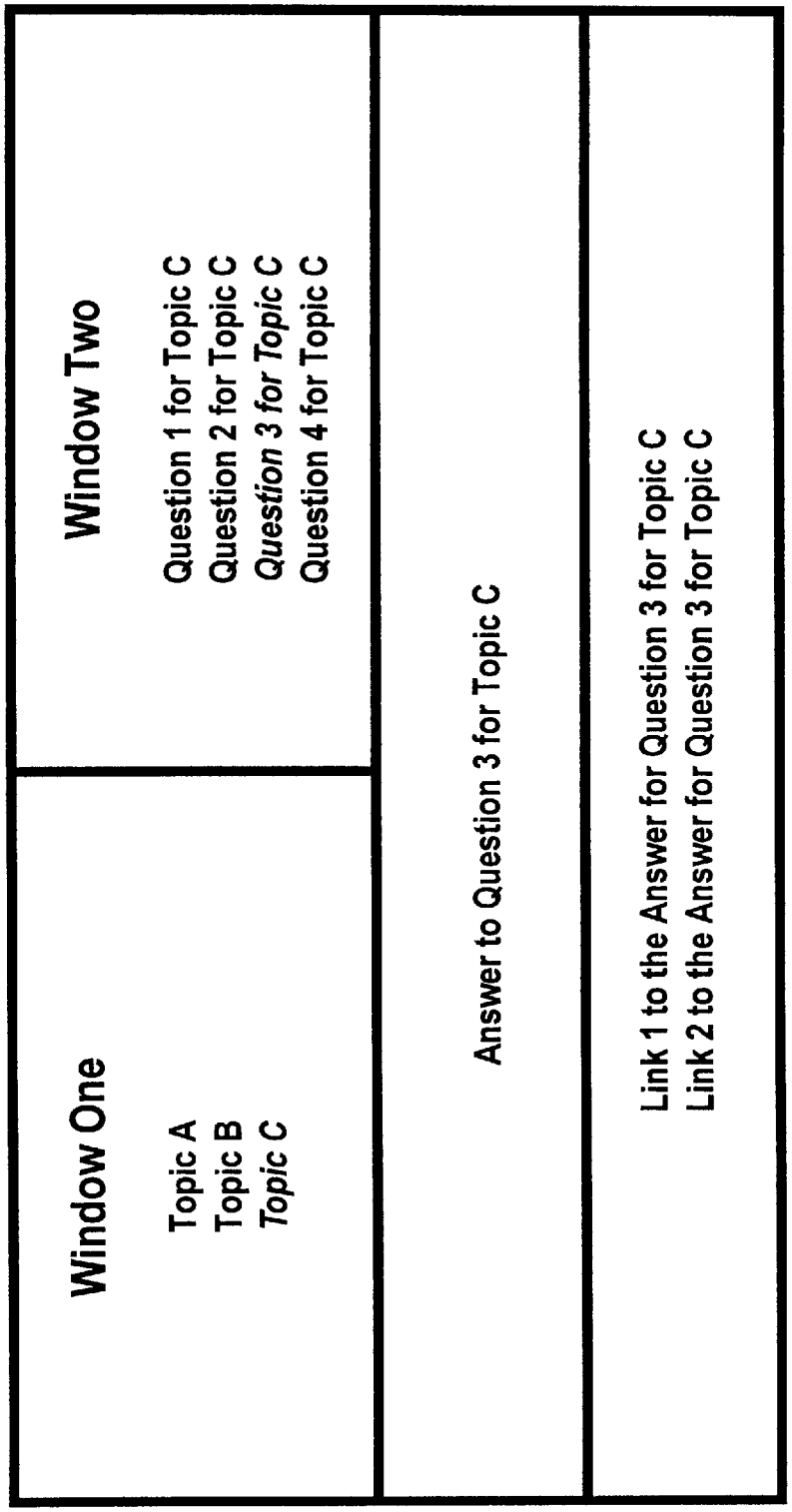
FIG. 6 is a schematic diagram of panoramic navigation user interface screen according to one embodiment of the present invention.

FIG. 6 is the preferred approach for the design of the computer interface that allows the simultaneous display of the four windows described in FIG. 22. Window One 61 contains at least one Topic and can be scrollable so as to display many topics in a list. When a user clicks on a Topic, Window Two 62 appears which contains at least one Question that is linked to the Topic that was selected. Window Two is also scrollable to accommodate lists of Questions. When a user clicks on a specific Question, Windows Three 63 and Four 64 appear. Window Three 63 contains the text of the specific Answer to the Question that was selected and Window Four 64 contains Links for the Answer that is displayed in Window Three. Windows Three and Four can also be scrollable. An important feature of the invention is that all the Knowledge Objects and Links that are displayed in Window One, Window Two, and Window Four are "Live" or "Hot" and can be clicked on at any time by the user as they navigate throughout the data base.

In an alternative embodiment, Windows Three and Four are combined. Indeed, the present claims may employ the phrase "screen area" to describe where the Topics, Questions, Answer and Links reside in order to connote regions of the screen without regard to any special meaning that may attach to the phrase "window."

FIG. 7 is an example screen of the panoramic navigational user interface. FIG. 7 shows generically the Windows One through Four of FIG. 6, for the Topics A–E, the Questions 1–5 corresponding to Topic A, the Answer to Question 4, and the Links for the Answer to Question 4.

Figure 8:
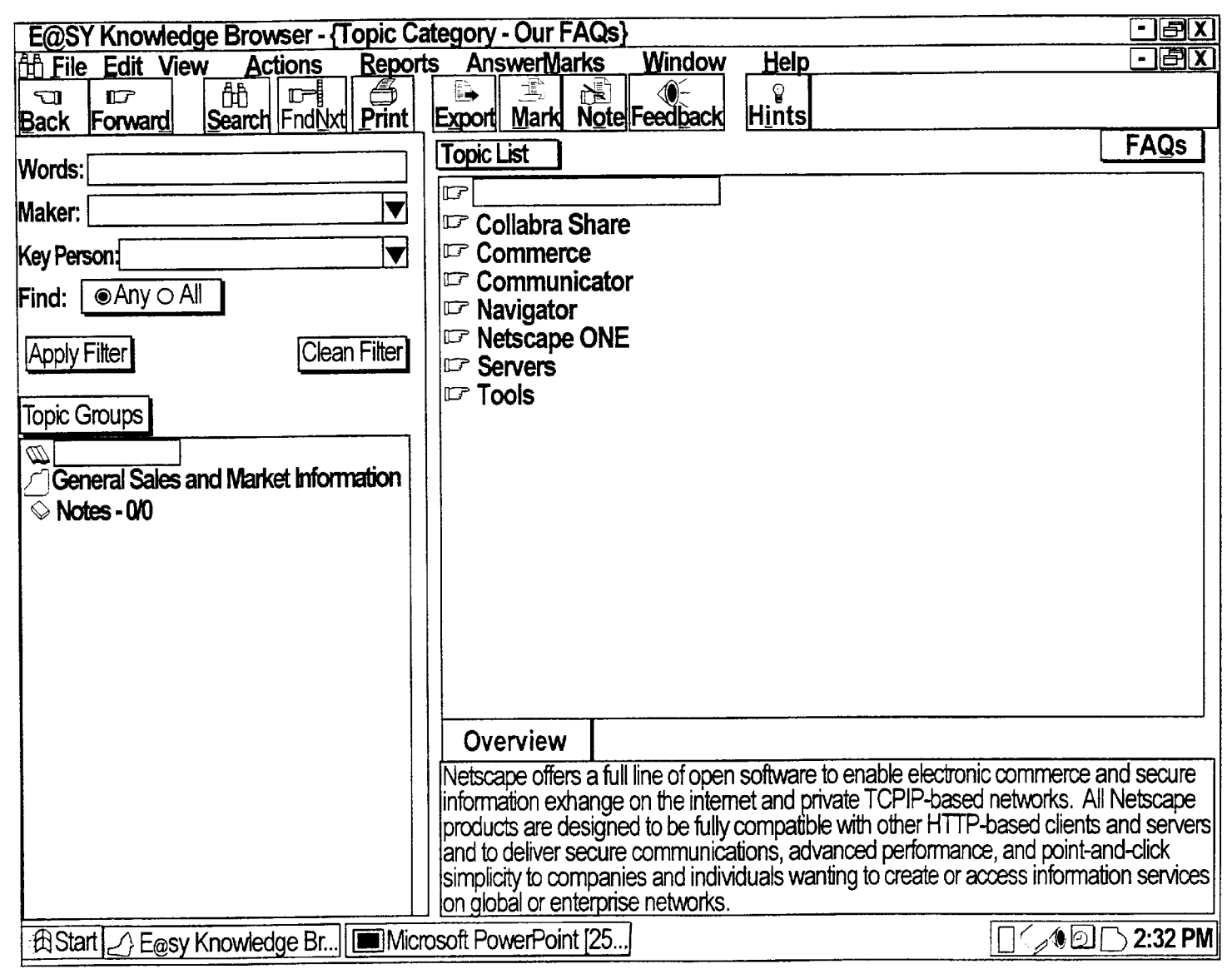

FIG. 8 is a screen that may precede the screen of FIG. 7. FIG. 8 presents the Groups of Topics that can be selected when higher order hierarchies are embodied by alternative embodiments of the invention. Thus, if any group of FIG. 8 is selected by the user, the Topics (arranged in one to many relationship with the Groups) are displayed in Window One of the screen of FIG. 7.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A network user interface system for organizing frequently asked questions, comprising:
    a database of topics, frequently asked questions, answers and links, wherein:
        the topics are arranged in the database in a one to many relationship with corresponding ones of the frequently asked questions,
        the questions are arranged in the database in a one to one relationship with corresponding ones of the answers, and
        the answers are arranged in the database in a one to many relationship with corresponding ones of the links, and an interface having:
            a first scrolling screen area of said topics from the database for selecting one of said topics;
            a second scrolling screen area of questions from the database corresponding to the selected topic, for selecting one of said questions;
            a third screen area of an answer corresponding to the selected question; and
            a fourth scrolling screen area of links from the database corresponding to the selected question.

2. A network user interface system according to claim 1, wherein the database connects the links to the selected question.

3. A network user interface system according to claim 1, wherein the database connects the links to the answer corresponding to the selected question.

4. A network user interface system according to claim 1, wherein the database further includes groups arranged in the database in one to many relationships with the topics, and the interface includes another screen area of groups for selecting one of said groups, and the first screen area of topics includes only topics corresponding to the selected group.

5. A network user interface system according to claim 1, further including an authoring system for modifying and creating said relationships between the topics, questions, answers and links of said database.

6. A network user interface system wherein the links are addresses to information external to the memory.

7. A system for answering frequently asked questions, comprising:
    an input terminal having a graphical display;
    a memory storing a database including:
        a table of topics;
        a table of questions arranged in one to many relationships with the topics;
        a table of answers arranged in one to one relationships with the questions;
        a table of links arranged in many to one relationships with the questions;
    a server for a network external to said terminal, memory and processor.
    a processor in electrical communication with the memory for:
        1) outputting the topics for display by the graphical display, 2) recognizing a selection of one of said displayed topics,
3) outputting questions corresponding to the selected topic to the display,
4) recognizing a selection of one of said displayed questions, and
5) outputting answers and links corresponding to the selected question to the display.

8. A system according to claim 7, wherein the processor further recognizes a selection of one of said displayed links, and outputs to the server an address corresponding to the selected link.

9. A system according to claim 7, wherein the memory further includes an authoring system, and wherein the processor employs the authoring system to modify and create said relationships between the topics, questions, answers and links.

10. A system according to claim 7, wherein the processor outputs the topics, corresponding questions, corresponding answer and corresponding links to the graphical interface for display in, respectively, four display windows.

* * * * *